United States Patent [19]

Boehmke

[11] 4,322,312

[45] Mar. 30, 1982

[54] PROCESS FOR PURIFICATION OF NON-IONIC EMULSIFIERS

[75] Inventor: Gunther Boehmke, Leverkusen, Fed. Rep. of Germany

[73] Assignee: Bayer Aktiengesellschaft, Leverkusen, Fed. Rep. of Germany

[21] Appl. No.: 99,123

[22] Filed: Nov. 30, 1979

[30] Foreign Application Priority Data

Dec. 16, 1978 [DE] Fed. Rep. of Germany ....... 2854541

[51] Int. Cl.$^3$ ...................... B01F 17/44; B01F 17/42; C07C 43/11; C07C 43/205
[52] U.S. Cl. .................................... 252/356; 252/351; 252/357; 252/DIG. 1; 568/609; 568/621
[58] Field of Search ................ 252/351, 356, DIG. 1; 568/609, 621

[56] References Cited

U.S. PATENT DOCUMENTS

| | | | |
|---|---|---|---|
| 2,149,498 | 3/1939 | Bludworth | 252/351 X |
| 2,213,477 | 9/1940 | Steindorff et al. | 252/351 X |
| 2,454,541 | 11/1948 | Bock et al. | 252/351 X |
| 2,930,778 | 3/1960 | Boettner | 252/351 X |

FOREIGN PATENT DOCUMENTS 854952 11/1960 United Kingdom ............... 568/609

OTHER PUBLICATIONS

Nonionic Surfactants, Edited by Schick, Marcel, Dekker, Inc., New York, 1967, pp. 125, 126, 157, 401, 416 and 417.

*Primary Examiner*—Richard D. Lovering
*Attorney, Agent, or Firm*—Sprung, Felfe, Horn, Lynch & Kramer

[57] ABSTRACT

Non-ionic emulsifiers which are of the type comprising addition products of alkylene oxides and compounds containing hydroxyl groups, carboxyl groups or carboxamide groups and are free from impurities originating from their preparation are obtained by dissolving the reaction mixtures in organic, water-immiscible organic solvents, treating the solutions with water, separating off the aqueous layer and, if appropriate, isolating the emulsifiers by removing the organic solvents.

15 Claims, No Drawings

PROCESS FOR PURIFICATION OF NON-IONIC EMULSIFIERS

The invention relates to a process for the purification of non-ionic emulsifiers which are of the type comprising addition products of alkylene oxides and compounds containing hydroxyl groups, carboxyl groups or carboxamide groups, for example alkyl-, alkylaryl-, aralkylphenyl-, acylamino- and acyl-polyglycol, the acylpolyols and acyl-polyol-polyglycols, from impurities comprising polyglycols, polyols or polyol-polyglycols originating from their preparation. The process is characterised in that an amount of water approximately corresponding to that of the impurities is added to solutions of the reaction mixtures in water-immiscible organic solvents, the aqueous layer which forms is separated off and, if appropriate, the emulsifier layer is dried and freed from solvent.

The invention also relates to the emulsifiers purified by this process.

In the preparation of non-ionic surface-active agents, impurities in the form of salts, polyglycols, polyols or polyol-polyglycols are formed by the use of catalysts during the alkoxylation, in particular ethoxylation or propoxylation, or the trans-esterification. For example, the oxyalkylation of a fatty alcohol is catalysed with the aid of potassium hydroxide solution. Because of the presence of the hydroxyl ion, an amount of polyalkylene glycol equivalent to the amount thereof is produced. The moisture in the raw materials and in the apparatus or the polyalkylene glycol content in the alkylene oxide lead to increased side reactions and an increased polyglycol content.

During the alkoxylation of carboxylic acids, in addition to the esterification and etherification, transesterification reactions also occur, since ideal transesterification conditions exist in the oxyalkylation batch as a result of the alkali metal alcoholates which are formed during the alkali-catalysed reaction. Thus, in the preparation of acyl-polyglycols, the product which can be expected is the statistical average which can be calculated for monoesters and diesters and up to 15% of polyglycols.

Similar proportions are found in the oxyalkylation of castor oil or monoglycerides and diglycerides.

When these non-ionic surface-active agents are employed as textile chemicals and as washing agents, the by-products are in general not a problem, and can even be desired. Thus, a few percent of polyglycols in alkyl-polyglycols can increase the solution rate in water since gel formation with a little water is reduced.

In contrast, the properties are adversely affected when the non-ionic surface-active agents are used as an emulsifier. For example, the effectiveness is diminished, and when the compounds are used in mixed emulsifiers, the synergistic action can be lost completely and use can thus become impossible.

In highly concentrated emulsions of active compound, for example, the viscosity can be greatly reduced by removing the polyglycols from the oxyalkylated castor oil emulsifier.

The storage stability and spontaneity of emulsion of emulsifiable plant protection concentrates are achieved only with a purified, non-ionic emulsifier component.

The impurities have a particularly troublesome effect in water-in-oil emulsions. The effectiveness, stability and viscosity are greatly influenced.

There are a number of processes for analytical determination of the polyglycols in non-ionic surface-active agents, and examples of these are mentioned here since they simultaneously comprise a separation:

1. Extraction of an ethyl acetate solution of the surface-active agent with a 5–15% strength sodium chloride solution.
2. Adsorption of the non-ionic surface-active agent on an ion exchanger containing COOH groups and elution with a solvent.
3. Gel chromatography.

None of these methods are suitable for industrial use, since the dilutions required are too great and the salt contents too high.

In the industrial preparation of pure, non-ionic emulsifiers, the property of this class of compound of separating out of an aqueous solution from the solution by heating has hitherto been utilised. An aqueous phase and an emulsifier phase containing a large amount of water are formed. The emulsifier phase must then be dried by distilling off the water (see German Reichs Pat. No. 828,839).

Not all emulsifiers lead to a clean phase separation in this method, and those with a chain of over 20 alkylene oxide units cannot be purified at all by this method since they display no turbidity point on heating.

The polyalkylene glycols which arise as the impurity dissolve, as do the emulsifiers, in the water-immiscible organic solvents proposed according to the invention. Preferred solvents are aromatic solvents, in particular benzene, which can be substituted by $C_1$–$C_4$-alkyl groups or halogen. Examples which may be mentioned are: benzene, toluene, xylene, chlorobenzene, dichlorobenzene, ethylbenzene and isopropylbenzene, especially toluene. Whilst on adding 1–20% of water the 10–90% strength solutions of the emulsifiers dissolve this in the solvent or form an opalescent emulsion, the polyglycols are separated out of the aromatic solvents on adding small amounts of water.

It is surprising that this separation takes place quantitatively and, in particular, that separation of the aqueous, highly concentrated polyalkylene glycol solution is still possible even in the case of an excess of the emulsifier of 99:1. In addition, the salts which are obtained after neutralisation of the catalyst are likewise separated out, whilst the losses of emulsifier to the aqueous phase are in the order of tenths of a percent.

The aqueous phase separated out is about 40–60% strength and can thus be burned directly to remove waste products.

The purification process according to the invention extends the known processes by providing them with the ability to also purify adducts with 20–100 mols of ethylene oxide units, to be carried out at very high concentrations, to achieve very high concentrations of polyalkylene glycol in the aqueous phase, to need very little water in thhe emulsifier phase, to also be applicable in the case of acylpolyols and to be carried out using inexpensive solvents customary for emulsions and at low or only slightly elevated temperatures.

Specific non-ionic emulsifiers which when formulated with a little water form highly viscous gels, such as, for example, oxyethylated fatty acid amides, cannot be purified by the known industrial methods, but are now accessible in a form which is free from polyethylene glycol by the process according to the invention.

An advantageous embodiment of the emulsifier purification consists in stirring the 40–70% strength, in particular 50–60% strength, toluene solution of the reaction mixture with 2–25%, in particular 10%, of water at 20° to 50° C., in particular 20°–40° C., for example for 10 minutes, and then leaving the mixture to settle. The lower aqueous polyglycol solution is separated off. When the process is used industrially, the separation can be effected rapidly and continuously via separators.

For analytical determination, the water is evaporated off from the aqueous layer and the polyglycol content is determined with a high accuracy.

In the case of repeated production and hence a known content of impurities, the amount of water can, if necessary, be further reduced and the water content of the emulsifier layer thereby decreased.

Depending on the course of the production and the properties of the product, it can also be advantageous first to dissolve the water in the reaction mixture and then to mix in the organic solvent.

Many applications of the emulsifier can be undertaken directly with this toluene solution. In other cases, incipient distillation, which effects complete drying, is advantageous. If moisture and the solvent cause problems, both can easily be removed and the pure emulsifier is ready to use.

The non-ionic emulsifiers are described in N. Schönfeldt "Äthylenoxidaddukte" ("Ethylene Oxide Adducts") Wissenschaftliche Verlagsgesellchaft Stuttgart (1976) and M. Schick, "Nonionic Sufactants" Marcel Dekker Verlag N.Y. (1966).

The purification operation proceeds in such a precisely reproducible manner that it can also be employed as an analytical method, in particular for production control.

EXAMPLE 1

100 g of di-phenylethyl-phenol, which has been oxyethylated with 14 mols of ethylene oxide in the presence of KOH with subsequent neutralisation with acetic acid, are dissolved in 100 ccs of toluene and the solution is stirred with 10 ccs of water for 10 minutes. The turbid solution is then allowed to settle (1–3 hours). About 7–8 g of an aqueous solution can be separated off at the bottom.

After drying, 4.5 g of residue can be determined. By dissolving the residue in acetone, filtering the solution and drying the residue, 0.3 g of potassium acetate can be determined.

After drying the emulsifier (by azeotropic distillation), it can be employed for plant protection formulations without impairment of storage stability and the quality of the emulsion.

A purification of the known type, by mixing with twice the amount of water, heated to 100° C., separating off the upper aqueous layer and working up the two layers, is far less favourable from an ecological, energetic and industrial point of view. Because of the dilution (3–4% strength), the aqueous layer cannot be burned directly, and the emulsifier layer must be freed from about the same amount of water by distillation, during which this layer must pass through stages of gel-like conditions.

EXAMPLE 2

100 g of the solid emulsifier, which were obtained by adding 50 mols of ethylene oxide onto diphenylethylphenol, are dissolved by stirring in 100 ccs of toluene and warming the mixture (about 40°). 15 ccs of water are distributed well in the solution by stirring. After 3 hours, an aqueous layer can be separated off at the bottom. On evaporating the 12 g of solution separated off, a polyglycol ether (PEG) residue of 6.6 g which is solid at room temperature and contains the oxyethylation catalyst (largely in the form of the carbonate) remains. The emulsifier is now free from polyethylene glycol and inorganic constituents.

If 100 g of an emulsifier purified in this manner are dissolved in 100 ccs of toluene and, as a control, a further 10 ccs of water are added, whilst stirring, in contrast to the previous case, the solution remains clear and transparent, that is to say the water is emulsified homogeneously.

A different purification is not successful in this case, since no separation at all can be achieved by heating with water because the emulsifier displays no turbidity point.

EXAMPLE 3

100 g of the emulsifier prepared from castor oil and 40 mols of ethylene oxide in the presence of KOH are mixed with 17 g of water and the mixture is then stirred with 100 ccs of toluene for 15 minutes. After leaving the mixture to stand for 1–2 hours, 22 g of a layer containing polyethylene glycol and containing 12.8 g of dry substance can be separated off.

The clear toluene solution can be diluted with 4 times the amount of toluene. The emulsion in water which can be prepared from this emulsifier solution has a considerably better stability than an emulsion prepared with the impure emulsifier.

A corresponding purification effect is achieved with benzene.

EXAMPLE 4

100 g of the emulsifier obtained from castor oil and 20 mols of ethylene oxide are stirred with 10 g of water and 100 ccs of toluene. The aqueous layer is separated off at the bottom and the emulsifier layer is freed from residues of water and from toluene in vacuo.

Using the purified emulsifier, clear formulations in mineral oils or white oil which can then be emulsified to give stable emulsions in water can be prepared.

The impure emulsifier does not dissolve in essentially paraffinic oils to give a clear solution.

Using lower aliphatics, the purified emulsifiers consisting of castor oil with a similar ethylene oxide content give stable water-in-oil emulsions of low viscosity.

EXAMPLE 5

A 50% strength solution in toluene of the oxyethylation product of oleic acid and 6 mols of ethylene oxide is prepared in toluene. 10% of water, relative to the emulsifier, are stirred into this solution and the lower, aqueous layer, which contains 7% of polyethylene glycol, relative to the emulsifier employed, is separated off. The emulsifier/toluene solution is freed from toluene and water via a thin film apparatus.

The purified emulsifier is now readily soluble in paraffinic mineral oils, stable emulsions of which in water can be used as cooling lubricants.

EXAMPLE 6

When used in an amount of 10%, isononylphenol, oxyethylated with 6 mols of ethylene oxide, has a good action as an emulsifier for mineral oils, which are employed as an emulsifier for mineral oils, which are employed as fibre dressings. However, the mixtures are not stable on storage but rapidly become turbid. On the other hand, solutions which are stable on storage are obtained using an emulsifier, purified via toluene, according to Example 1, from which 1.5–2.5% of the polyethylene glycol and the oxyethylation catalyst have been separated off.

EXAMPLE 7

Coconut oil alcohol ($C_{12}$–$C_{16}$), oxyethylated with 7 mols of ethylene oxide, is purified according to Example 1. Toluene is distilled off only until the water is removed azeotropically. A formulation containing 10% of Parathion, 12% of the purified emulsifier and paraffin oil (boiling point 180°–2500°) to make up the remainder is stable physically and chemically for months, such that no loss in effectiveness and the stability of the emulsion can be observed.

EXAMPLE 8

An esterification product obtained from 1 mol of oleic acid and 1 mol of glycerol, water being split off, is freed from unreacted glycerol according to Example 1. The toluene and the rest of the water are distilled off.

Whilst both the crude product and the purified monoglyceride can be employed as an anti-foaming agent, only the purified product is suitable for mixing with triglycerides (or paraffin oils), in order then to be used as an anti-foaming agent emulsion. The glycerol (polyglycerol) is completely insoluble in the oils mentioned.

I claim:

1. A process for the purification of non-ionic emulsifiers of the type comprising addition products of alkylene oxides and compounds containing hydroxyl groups, carboxyl groups or carboxamide groups from impurities originating from their preparation, characterized in that the reaction mixtures are dissolved in organic, water-immiscible organic solvents, the solutions are treated with water, the resultant two layers are allowed to settle and the lower aqueous layer containing the impurities is separated off from the bottom.

2. Process according to claim 1, characterised in that alkyl-, alkylaryl-, aralkylphenyl-, acyl- or acylaminopolyglycols are purified from polyglycols, polyols and polyol-polyglycols formed during their preparation.

3. Process according to claim 1, characterised in that benzene, which can be substituted by $C_1$–$C_4$-alkyl groups or halogen, is used as the organic solvent.

4. A process according to claim 3, wherein said organic solvent is toluene.

5. Process according to claim 1, characterised in that a 40–70% strength, solution of the reaction mixture is stirred in the organic solvent with 2–25% of water at 20°–50° C. and the aqueous layer is removed.

6. A process according to claim 5, wherein the strength of said solution is 50 to 60% and the solution of the reaction mixture is stirred in said organic solvent at a temperature of 20° to 40° C.

7. Process according to claim 1, characterised in that non-ionic emulsifiers with a chain of over 20 alkylene oxide units are purified.

8. A process according to claim 1, wherein said compound containing hydroxyl group is oleic acid.

9. A process according to claim 1, wherein said compound containing hydroxyl group is isononylphenol.

10. A process according to claim 1, wherein said compound containing hydroxyl group is castor oil.

11. A process according to claim 1, wherein said compound containing hydroxyl group is diphenylethylphenol.

12. A process according to claim 12, wherein said compound containing hydroxyl group is coconut oil alcohol.

13. A process according to claim 1, wherein an alkylene oxide contacts a compound containing a carboxyl group.

14. A process according to claim 1, wherein an alkylene oxide contacts a compound containing a carboxamide group.

15. A process according to claim 1, wherein following removal of said lower aqueous layer, said organic water immiscible organic solvent is separated from said emulsifier.

* * * * *